3,556,763
COMPOSITION AND METHOD FOR DESUCKING TOBACCO
Bob G. Gower, Park Forest, and David W. Young, Homewood, Ill., assignors to Atlantic Richfield Company, a corporation of Pennsylvania
No Drawing. Filed Aug. 17, 1966, Ser. No. 572,894
Int. Cl. A01n 5/00
U.S. Cl. 71—78          14 Claims

ABSTRACT OF THE DISCLOSURE

Aqueous emulsions of water-insoluble horticultural chemicals, such as water-insoluble pesticidal, fungicidal and growth-regulating chemicals, are prepared using as the emulsifying agent a hydrocarbyloxy polyalkylene glycol-esterified polymer of styrene and maleic anhydride, e.g. a methoxy polyethylene glycol-esterified polymer of styrene and maleic anhydride. The emulsifying agent is effective even when present in very minor amounts, e.g. about 0.01 to 0.3 parts by weight of the agent per part of the horticultural chemical. Moreover, the compositions leave little or no visible deposit on the plant life to which they are applied. Particularly suitable horticultural chemicals are tobacco desuckering agents such as petroleum mineral oils, fatty acid esters, long-chain aliphatic aldehydes, and long-chain aliphatic alcohols.

---

This invention relates to improved aqueous emulsions of horticultural chemicals. More particularly it concerns the use of alkoxy polyalkylene glycol-esterified polymers of styrene and maleic anhydride as surface-active agents in aqueous emulsions of horticultural chemicals such as plant growth regulants.

Numerous pesticidal, fungicidal and growth-regulating chemicals used in plant crop production are preferably employed in aqueous media. Dilution is nearly always necessary for application of the agents in realistic dosages and is often required in order to achieve uniform application of those chemicals which normally exist as solids. The preference of water as a diluent obviously stems from its non-deleterious, if not always beneficial, effects on plant life and from simple economic reasons as well. Due to the fact that these agents frequently exhibit limited, if any, solubility in water, however, they are usually dispersed in the aqueous vehicle with the aid of a suitable surface active agent, resulting in the formation of a semi-stable or stable emulsion. Various non-ionic, cationic and anionic surface active agents have been employed for the preparation of such water base horticultural chemicals including, for example, block copolymers of ethylene oxide and propylene oxide (such as the commercially available material Pluronic L61), nonyl phenol polyethyleneoxide (such as the commercially available material Lissapol N), alkali metal salts of stearic acid, polyethyleneoxide esters of stearic acid (as, for example, the commercially available material Ethofat 60/15), polyoxyethylene sorbitan monolaurate (commercially available as Tween-20), mixture of alkyl aryl sulfonates and polyoxyethylene sorbitan esters of fatty acids (such as Altox G–2018), etc. More than simply effecting a dispersion, suspension or emulsion of the selected chemicals in the aqueous vehicle, however, it is further required of a suitable surface-active agent that, for instance, the surfactant be non-deleterious to the plants to be treated, that it leave little or no visible deposit on the vegetation and, just as important, that it be economical, for example, that it be an effective emulsifier when present in very small concentrations in the aqueous compositions.

It has now been found that by the use of the surface active agent of the present invention aqueous emulsions of horticultural chemicals, such as plant growth regulants, which are substantially water-insoluble can be prepared which will leave little or no visible deposit on plant life to which they are applied. In addition, the presence of surprisingly small amounts of the surface active agent of this invention is sufficient in most cases to effect a suitable emulsion, thus providing significant savings in the overall cost of crop treatment with such water-borne agents. Further, the aqueous emulsions of the present invention have the advantage of being stable and applicable under conditions of neutral pH.

In accordance with the present invention, an aqueous emulsion, containing about 70 to 99% by weight of water, of a substantially water-insoluble horticultural chemical is prepared by the inclusion in amounts, usually minor, sufficient to effect emulsification of a hydrocarbyloxy polyalkylene glycol-esterified polymer of styrene and maleic anhydride. Based upon the amount of horticultural chemical present in the emulsion, there may often be employed about 0.01 to 0.30 parts of esterified polymer for each part by weight of horticultural chemical. The polymer contains a molar ratio of polymerized styrene to polymerized maleic anhydride of about 1:1 to 4:1 and has an average molecular weight, prior to esterification, of about 600 to 5000, preferably up to about 2500. About 2 to 75%, preferably about 20 to 60%, of the total number of carboxyl carbon atoms of the polymer are esterified with the hydrocarbyloxy polyalkylene glycol. Suitable esterifying glycols are those corresponding to the general formula:

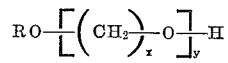

wherein $x$ is 2 to 5, preferably 2 to 3; $y$ is 2 to 150, preferably 4 to 25; and R is a monovalent hydrocarbon radical of 1 to about 30, preferably 1 to about 15, carbon atoms, whose adjacent carbon atoms are no closer than 1.40 A. (i.e., a non-olefinic, non-acetylenic, monovalent hydrocarbon). R is preferably alkyl. As preferred glycols, may be mentioned the methoxy polyethylene glycols having an average molecular weight of about 300 to 1500.

Preparation of the esterified styrene-maleic anhydride polymer surfactant of the present invention may be by known methods; for example, it can be made in accordance with the teachings of copending application, Ser. No. 129,981, filed Aug. 8, 1961, now U.S. Pat. No. 3,342,787. Thus, styrene and maleic anhydride can be first polymerized, for instance, by solution polymerization where the monomers are polymerized in a suitable solvent employing as a polymerization catalyst a free-radical catalyst, such as a peroxide, preferably benzoyl peroxide, dicumyl peroxide or an alkyl peroxy dicarbonate, at a temperature of about 75 to 300° C. or more. Suitable solvents include the aromatic hydrocarbon solvents, such as cumene, p-cymene, xylene, toluene, etc. Other suitable solvents are the ketones, such as methylethylketone. A preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture.

When an aromatic solvent is employed as the solvent for the polymerization, the formation of the copolymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation.

Esterification of the styrene-maleic anhydride polymer with the hydrocarboxyloxy polyalkylene glycol may advantageously be conducted in the presence of catalytic amounts of fatty acid metal salt, preferably an alkali metal salt.

The agricultural chemical may comprise a fungicide, pesticide, herbicide, plant growth regulant, or other chemical used to ensure plant health, which is insoluble, or substantially insoluble, in water. As suitable agricultural chemicals may be mentioned fungicides such as fungicidal copper compounds, for example, cuprous oxide, copper hydroxide and copper oxychloride; nickel fungicides, for example, nickel hydroxide; the organo sulphur fungicides, for example, tetramethylthiuram disulphide and divalent metal salts, such as zinc and manganese of ethylen-bis-dithiocarbamic acid; insecticides, such as a dried culture of B. thuringiensis or related strains or species, DDT, BHC, sevin (alpha naphthyl ester of N-methyl carbamic acid), aldrin, dieldrin, bis-N,N,N′,N′-tetramethylphosphorodiamidic anhydride, and O,O-dimethyl-S-(N-methylcarbamoyl-methyl) phosphorodithioate; herbicides, such as N-parachlorophenyl-N′,N′-dimethylurea, simazin (bis-monoethylaminochloro-s-triazine) and atrazine (chloro-monoethylamino-mono-iso-propylamino-s-triazine); and plant growth regulants such as desuckering agents for tobacco, tomato, cotton and soybean plants. The surfactant of the present invention has been found to be particularly useful in the preparation of aqueous emulsions of those plant growth regulating chemicals known as tobacco desuckering agents.

Tobacco plants are customarily "topped" at predetermined stages of growth, i.e. the main leader or terminal bud of the plant is broken and removed when it begins to flower in order to redirect the plant's energies to the growth of its leaves. An attendant result of topping, however, is the promotion of rapid growth of secondary buds, known as "suckers," which form at the points where the leaf stems join the plant. Sucker growth saps the plant of energy and creates undesirable shade over portions of the plant; the result, if suckers are allowed to grow undistubed, is a substantial lessening in the overall size and quality of the tobacco leaves. To combat sucker growth, the axillary buds are either manually removed or treated with a desuckering agent which retards their growth. Chemicals which have been employed as desuckering agents include, for example, petroleum mineral oils, e.g. naphthenic base oils; hydroxymethyl and aminomethyl derivatives of maleic hydrazide and their salts; phosphonium halides; halo-carbanilic acid esters; secondary and tertiary amine salts; vegetable oils; lower alkyl esters of $C_6$ to $C_{20}$ saturated and unsaturated fatty acids; alkanals of $C_6$ to $C_{20}$ carbon atoms; and primary alkanols of $C_6$ to $C_{20}$ carbon atoms. Many of these agents are substantially water insoluble and require the presence of a surfactant to provide a suitable aqueous emulsion. The esterified polymer of the present invention performs exceptionally well as a surface active agent in aqueous emulsions of the above tobacco desuckering agents. Smaller amounts of the esterified polymer are required than is necessary with surfactants heretofore employed, the emulsions may be prepared and applied at a pH of about 7 to 10 and there is usually no visible residue remaining on the plants after treatment.

The invention will be better understood by reference to the following examples which are included herein for purposes of illustration only and are not intended to be limiting.

EXAMPLE I

Aqueous emulsions were prepared of three tobacco desuckering agents, methyl laurate, methyl pelargonate and pelargonic aldehyde, using the esterified polymer surfactant of the present invention and using a leading commercially available surfactant, polyoxyethylene sorbitan monolaurate.

The esterified polymer of the present example was prepared by reacting, in a nitrogen atmosphere, 306 grams of a 2:1 styrene-maleic anhydride polymer having a molecular weight of about 1700 with 350 grams of a methoxy-polyethyleneglycol having a molecular weight of about 350. Lithium acetate (3.0 grams) was used as the catalyst. The mixture was stirred for two hours at 165° C. and a portion of the waxy material produced was further diluted with methoxy polyethyleneglycol to give a solution of 200 grams of a 100% half-ester of the styrene-maleic anhydride polymer in 100 grams of unreacted methoxy polyethyleneglycol.

Using the polyoxyethylene sorbitan monolaurate, about 1 weight percent of the surfactant, based on the total weight of the emulsion, was required in each case to effect a suitable emulsion containing 6 weight percent of the active desuckering agent. This contrasted with a requirement of only about 0.5% of the surfactant of the present invention to effect a 6% emulsion of the agent under conditions of neutral pH. The effect on sucker growth, 13 days after treating tobacco plants by spray application of 20 ml. per plant of each of the emulsions, are given in Table I.

TABLE I

| | | Sucker control [1] | |
|---|---|---|---|
| Active compound | Tobacco type | 1% polyoxyethylene glycol sorbitan monolaurate | 0.5% methoxy polyethylene glycol ester of styrene-maleic anhydride polymer |
| Methyl laurate | Hicks | 96.8 | 95.8 |
| Do | Conn. broadleaf | 64.9 | 70.2 |
| Do | Catterton | 91.2 | 95.6 |
| Do | Burley | 96.3 | 92.4 |
| Methyl pelargonate | Hicks | 99.9 | 97.2 |
| Do | Conn. broadleaf | 69.5 | 85.4 |
| Do | Catterton | 96.8 | 91.0 |
| Do | Burley | 100 | 99.8 |
| Pelargonic aldehyde | Hicks | 97.1 | 94.1 |
| Do | Conn. broadleaf | 99.6 | 71.0 |
| Do | Catterton | 96.2 | 82.4 |
| Do | Burley | 99.2 | 96.3 |

[1] Percent by which treatment reduced sucker green weight compared to untreated control.

It can be readily seen from the data reported in Table I that the three desuckering agents were effective when employing the surfactant of the present invention. Slightly more injury to the plants treated was observed when the surfactant of this invention was employed in the methyl laurate and pelargonic aldehyde compositions, but the converse was noted in comparing the use of the two surfactants in the methyl pelargonate treatments. In all events the plant damage was not excessive, ranging from slight to moderate in degree, and no visible residue was left on the plants. The significant observation to be made is that the surfactant of the present invention is effective when employed at one-half the concentration of the prior art compound.

EXAMPLE II

Further studies were conducted to evaluate the performance of the polyalkylene glycol ethers per se, i.e., not combined through esterification with the styrene-maleic anhydride polymer, as surfactants in aqueous-based tobacco desuckering sprays. Tobacco plants were treated with the formulations reported in Table II.

TABLE II

| | Active compound, wt. percent in total emulsion | | Surfactant, wt. percent in total emulsion | |
|---|---|---|---|---|
| Composition | Methyl ester of mixed $C_8$–$C_{10}$ fatty acids | Methyl ester of mixed $C_8$–$C_{18}$ fatty acids | A | B |
| I | 6 | | 3 | |
| II | 6 | | | 1 |
| III | | 6 | 3 | |
| IV | | 6 | | 1 |

Surfactants A and B are commercial products having the following reported properties.

| Surfactant | Chemical composition | Form in which supplied | Color | Solidification range | Density |
|---|---|---|---|---|---|
| A | Fatty alcohol polyglycol ether. | Lard-like mass. | White | Approx. 68° F. (20° C.). | 1.0 at 68° F. (20° C.). |
| B | Fatty alcohol polyglycol ether. | Liquid | Pale yellow. | Approx. 39–46° F. (4–8° C.). | 0.90 at 68° F. (20° C.). |

In addition to compositions I–IV of Table II, there were also prepared and applied to tobacco plants aqueous emulsions containing 4, 5 and 7 weight percent of the mixed fatty acid esters. Sucker growth was effectively controlled at all concentration levels; in all cases, however, severe leaf injury and burn occurred. Thus, it is seen that the esterified styrene-maleic anhydride polymer surfactants of the present invention, effective at smaller concentrations than emulsifying agents previously employed, are also decidedly less injurious to desired leaf growth.

EXAMPLE III

Similar tests were conducted as in Example I but using, instead of the surfactant of the present invention, an ammonium salt of a 50% ethylene glycol monobutyl ether half-ester of a 1:1 styrene-maleic anhydride polymer having an unesterified molecular weight of about 1600. Methyl caprate was employed as the active desuckering agent. The degree of sucker control was about the same as observed for Example I and the surfactant was also effective at 0.5 weight percent concentrations; however, the treatment left a heavy white residue on the tobacco leaves. Thus, it is seen that the use of lower molecular weight glycol ethers, as the esterifying component for the styrene-maleic anhydride polymers, yields a surface active agent which, unlike the higher molecular weight compounds of the present invention, will result in deposit of an undesirable visible residue on the plants.

EXAMPLE IV

A tobacco desuckering emulsion is prepared using as the active compound a duotreated naphthenic oil of extremely low aromatic content and analyzing as follows.

| | |
|---|---|
| Gravity, API | 26.2 |
| Flash pt. | 315 |
| Fire pt. | 355 |
| K.V./100°, cs. | 21.39 |
| K.V./210°, cs. | 3.59 |
| Pour pt. | −35 |
| ASTM color | 0.5 |
| Saybolt color | 30+ |
| Specific dispersion | 99.2 |
| Aniline pt. | 87.2 |
| Iodine No. | 1.1 |
| Mol. wt. | 328 |
| $N_D^{20}$ | 1.4846 |

| ASTM distillation: | ° F. |
|---|---|
| IBP | 480 |
| 5% | 645 |
| 50% | 663 |
| 95% | 762 |

The emulsion is prepared with 50 weight percent of the above mineral oil and 49% water, using 1% of the methoxy polyethyleneglycol-esterified styrene-maleic anhydride polymer of Example I as the surfactant. Application of the emulsion by hand to sucker buds of both burley and flue-cured type tobacco, in an amount of approximately one teaspoon of the emulsion per tobacco plant, provides effective control of sucker growth with little or no damage to the plant leaves.

The compositions of the present invention may be suitable for spray or brush application depending on the particular horticultural chemical employed. Thus, for example, aqueous emulsions of mineral oils when employed as desuckering agents are usually locally applied by brush due to the otherwise deleterious effect on the plant if applied to its entirety. Fatty acid derivatives, on the other hand, are generally safe for spray application, for example, in tobacco desuckering treatments. The compositions can also be in the form of concentrates for storage or sale which may be of paste or grease-like consistency suitable for dilution to application strength at the time of use. The compositions of the invention may of course contain additional ingredients, such as inert diluents, hormones, e.g. indole-3-acetic acid, anti-flocculants, etc., which are commonly included in agricultural chemicals.

What is claimed is:

1. A tobacco plant desuckering composition comprising an aqueous emulsion of an effective amount of a substantially water-insoluble, emulsifiable tobacco desuckering agent selected from the group consisting of naphthenic base mineral oils and lower alkyl esters of $C_6$ to $C_{20}$ fatty acids and about 0.01 to 0.3 part by weight with respect to the weight of the tobacco desuckering agent of a polymer of styrene and maleic anhydride, said polymer being present in an amount to effect emulsification, and having a molar ratio of polymerized styrene to polymerized maleic anhydride of about 1:1 to 4:1, an unesterified molecular weight of about 600 to 5000 and about 2 to 75% of its carboxyl carbon atoms esterified with a hydrocarbyloxy polyalkylene glycol corresponding to the general formula:

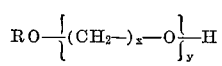

wherein $x$ is 2 to 5, $y$ is 2 to 150 and R is a monovalent hydrocarbon radical of 1 to about 30 carbon atoms, the adjacent carbon atoms of which are not closer than 1.40 A.

2. The composition of claim 1 wherein $x$ is 2 to 3, $y$ is 4 to 25 and R is alkyl of 1 to about 15 carbon atoms.

3. The composition of claim 1 wherein the hydrocarboxyloxy polyalkylene glycol is a methoxy polyethylene glycol having a molecular weight of about 300 to 1500.

4. The composition of claim 3 wherein the pH of the aqueous emulsion is about 7 to 10.

5. The composition of claim 4 wherein water comprises about 70 to 99 weight percent of the total emulsion.

6. The composition of claim 4 wherein the desuckering agent is a lower alkyl ester of a $C_6$ to $C_{20}$ fatty acid.

7. A process of desuckering tobacco plants which comprises applying to said plants an aqueous emulsion comprising an effective amount of a substantially water-insoluble, tobacco desuckering agent and a minor amount, sufficient to effect emulsification, of a polymer of styrene and maleic anhydride, said polymer having a molar ratio of polymerized styrene to polymerized maleic anhydride of about 1:1 to 4:1, an unesterified molecular weight of about 600 to 5000 and about 2 to 75% of its carboxyl carbon atoms esterified with a hydrocarbyloxy polyalkylene glycol corresponding to the general formula:

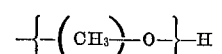

wherein $x$ is a 2 to 5, $y$ is 2 to 150 and R is a monovalent hydrocarbon radical of 1 to about 30 carbon atoms, the adjacent carbon atoms of which are no closer than 140 A.

8. The process of claim 7 wherein for each part by weight of said tobacco desuckering agent in the emulsion there is present about 0.01 to 0.3 part of said polymer.

9. The process of claim 8 wherein the tobacco desuckering agent is selected from the group consisting of naphthenic base mineral oils and lower alkyl esters of $C_6$ to $C_{20}$ fatty acids.

10. The process of claim 9 wherein $x$ is 2 to 3, $y$ is 4 to 25 and R is alkyl of 1 to about 15 carbon atoms.

11. The process of claim 10 wherein the hydrocarbyloxy polyalkylene glycol is a methoxy polyethylene glycol having a molecular weight of about 300 to 1500.

12. The process of claim 11 wherein the pH of the aqueous emulsion is about 7 to 10.

13. The process of claim 12 wherein water comprises about 70 to 99 weight percent of the total emulsion.

14. The process of claim 13 wherein the desuckering agent is a lower alkyl ester of a $C_6$ to $C_{20}$ fatty acid.

References Cited

UNITED STATES PATENTS

| | | | |
|---|---|---|---|
| 3,223,513 | 12/1965 | Geary | 71—92 |
| 3,313,755 | 4/1967 | O'Rourke | 260—78.5 |
| 3,322,713 | 5/1967 | Williams | 260—78.5 |
| 3,326,664 | 6/1967 | Tso I | 71—78 |
| 3,326,864 | 6/1967 | Moore et al. | 260—78.5 |
| 3,340,040 | 9/1967 | Tso | 71—78 |
| 3,342,787 | 9/1967 | Muskat | 252—302 |
| 3,360,356 | 12/1967 | Vartiak | 71—92 |
| 3,363,029 | 1/1968 | Verdol et al. | 260—78.5 |

FOREIGN PATENTS

| | | | |
|---|---|---|---|
| 557,625 | 5/1958 | Canada | 71—78 |

OTHER REFERENCES

McCutcheon: "Detergents and Emulsifiers Annual" (1963), p. 67.

LEWIS GOTTS, Primary Examiner

G. HOLLRAH, Assistant Examiner

U.S. Cl. X.R.

71—106, 127; 260—78.5; 424—78, 358